US008989151B2

(12) United States Patent
Ewert et al.

(10) Patent No.: US 8,989,151 B2
(45) Date of Patent: Mar. 24, 2015

(54) SHORT MESSAGING SERVICE OVER 3GPP LONG TERM EVOLUTION

(75) Inventors: Joerg Christian Ewert, Aachen (DE); Ralf Keller, Würselen (DE); Andreas Witzel, Herzogenrath (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 61 days.

(21) Appl. No.: 13/376,751

(22) PCT Filed: Dec. 23, 2009

(86) PCT No.: PCT/EP2009/067874
§ 371 (c)(1),
(2), (4) Date: Feb. 17, 2012

(87) PCT Pub. No.: WO2010/142357
PCT Pub. Date: Dec. 16, 2010

(65) Prior Publication Data
US 2012/0134351 A1   May 31, 2012

Related U.S. Application Data

(60) Provisional application No. 61/185,515, filed on Jun. 9, 2009.

(51) Int. Cl.
*H04W 4/00* (2009.01)
*H04L 12/58* (2006.01)
(Continued)

(52) U.S. Cl.
CPC .......... *H04L 12/581* (2013.01); *H04L 12/5835* (2013.01); *H04L 51/04* (2013.01); *H04L 51/066* (2013.01); *H04W 4/14* (2013.01); *H04L 65/1016* (2013.01); *H04W 4/18* (2013.01)
USPC ........... 370/332; 370/389; 370/465; 370/335; 455/422.1

(58) Field of Classification Search
CPC ........ H04W 4/14; H04W 4/18; H04L 12/581; H04L 51/066; H04L 12/5835; H04L 51/04; H04L 65/1016
USPC .......................... 370/352–356, 465, 389, 338
See application file for complete search history.

(56) References Cited

U.S. PATENT DOCUMENTS
7,907,533 B2 * 3/2011 Davidson et al. ............. 370/241
(Continued)

FOREIGN PATENT DOCUMENTS
CN          101047630          10/2007
(Continued)

OTHER PUBLICATIONS
3rd Generation Partnership Project. "Technical Specification Group Services and System Aspects; Support of Short Message Service (SMS) over generic 3GPP Internet Protocol (IP) access," TS 23.204, Stage 2, Release 8, Mar. 1, 2009, pp. 1-37, Sophia-Antipolis Cedex, France.

*Primary Examiner* — Chandrahas Patel
*Assistant Examiner* — Lan Huong Truong
(74) *Attorney, Agent, or Firm* — Coats & Bennett, PLLC

(57) ABSTRACT

The application relates to SMS over LTE radio access. Several alternatives are already known, such as specified in 3GPP TS 24.247 which supports text messaging capabilities and 3GPP 23.204 which supports all existing SMS capabilities through SMS encapsulation in IP. Furthermore, 3GPP 23.272 which relates to SMS in CS fallback. A further technique is known as Generic Access Network which is under study in 3GPP 23.879 relating to CS domain services over evolved PS access and in Voice Over LTE VOLGA. The present application provides a solution for handling messages between legacy networks in the form of circuit-switched networks and IP network architecture in the form of an IP Multimedia Subsystem IMS while minimizing the efforts needed for system integration by maximal reuse of existing functionalities. This is achieved by an entity (100) which adapts messages received from the IMS (50) in such a way that the appear to a controller entity (200) providing conventional short message functionalities as if they have been received from a mobile terminal accessing a radio access network through a radio network interface of a circuit-switched network (40).

11 Claims, 5 Drawing Sheets

(51) Int. Cl.
*H04W 4/14* (2009.01)
*H04L 29/06* (2006.01)
*H04W 4/18* (2009.01)

(56) References Cited

U.S. PATENT DOCUMENTS

| | | | |
|---|---|---|---|
| 7,974,618 B2* | 7/2011 | Silver | 455/426.1 |
| 8,548,419 B1* | 10/2013 | Sennett et al. | 455/404.1 |
| 2003/0031160 A1* | 2/2003 | Gibson Ang et al. | 370/349 |
| 2003/0072425 A1* | 4/2003 | Hurst | 379/114.01 |
| 2003/0095566 A1* | 5/2003 | Bunting et al. | 370/465 |
| 2004/0181550 A1* | 9/2004 | Warsta et al. | 707/104.1 |
| 2005/0117602 A1 | 6/2005 | Carrigan et al. | |
| 2006/0025129 A1* | 2/2006 | Wolfman et al. | 455/432.1 |
| 2007/0287445 A1* | 12/2007 | Logan | 455/423 |
| 2007/0293216 A1* | 12/2007 | Jiang | 455/433 |
| 2008/0004051 A1* | 1/2008 | Sylvain | 455/466 |
| 2008/0090555 A1* | 4/2008 | Patel et al. | 455/414.1 |
| 2009/0034511 A1 | 2/2009 | Hundscheidt et al. | |
| 2009/0129372 A1 | 5/2009 | Pandey et al. | |
| 2010/0177764 A1 | 7/2010 | Witzel et al. | |
| 2010/0215018 A1* | 8/2010 | Ejzak | 370/331 |
| 2011/0098066 A1* | 4/2011 | Goermer et al. | 455/466 |
| 2012/0108222 A1* | 5/2012 | Silver et al. | 455/415 |

FOREIGN PATENT DOCUMENTS

| | | |
|---|---|---|
| EP | 1763185 A1 | 3/2007 |
| EP | 1798933 A1 | 6/2007 |
| EP | 1871048 A1 | 12/2007 |
| EP | 1874066 A1 | 1/2008 |
| JP | 2005526470 A | 9/2005 |
| JP | 2008005497 A | 1/2008 |
| WO | 2005122604 A2 | 12/2005 |

* cited by examiner

SHORT MESSAGING SERVICE OVER 3GPP LONG TERM EVOLUTION

TECHNICAL FIELD OF THE INVENTION

The present invention deals with handling messages in communication networks and more particularly with adapting messages between legacy networks like circuit switched networks and IP network architectures like IP multimedia subsystem.

BACKGROUND OF THE INVENTION

It is the long term industry vision to base wireless and wireline networks on MMTel/IMS architecture in the future. It is obvious that this migration step will take a long time and that "legacy" services (e.g. SMS) need to be supported. Some known solutions provide a migration path from MSS towards IMS by reusing the existing MSC-S as application server. At present, there is an ongoing debate about which mechanism to select to provide SMS over LTE radio access. In the following, known available alternatives for SMS over LTE are summarized.

OMA-IM is specified in CNA-TS-Simple IM series of specifications and in 3GPP TS 24.247. It supports deferred messaging over IMS and can support text messaging capabilities with a similar user experience to user-to-user text messaging using SMS and also can support similar capabilities as those provided by MMS. Support for domain selection is defined in specification 23.204.

Another known technique is typically referred as SMS over IP, as specified in 3GPP 23.204. All existing SMS capabilities are supported through SMS encapsulation in IP.

A further known technique is known as SMS in CS Fallback, specified in 3GPP 23.272. SMS is carried in NAS signalling when camping on LTE; operator can configure network and terminal to use SMS over IP instead. This requires CS Fallback capable phones and networks and also requires CS/PS mode 1 or mode 2 of operation (3GPP TS 24.301). It is noted that CS Fallback is seen as interim step before introducing MMTel over LTE, but not necessarily used together with MMTel "just" to provide SMS plus IP telephony.

A further known technique is known as GAN, which is under study in 3GPP TR 23.879 and in VOLGA. It provides all CS services in LTE, including SMS, over PS bearer. The current status is that the GAN based solution will not be adopted by 3GPP as a number of operators objected to it.

A further known technique is known as SMS in PS. SMS over PS access is specified for GPRS access, but not for EPS.

FIG. 6 represents some details of the known technique of SMS over IP 23.204. FIG. 6 shows the architecture of SMS over IP as defined in TS 23.204. It is apparent that the IP-SMS-GW is defined as an application server attached via ISC to the IMS core nodes. After registration in the IMS, the subscriber can send and receive SMS. An example of handling of subscriber initiated SMS is illustrated in FIG. 7. FIG. 8 illustrates an example of handling of subscriber initiated Instant Message (IM).

The sequence as such is very similar for SMS and IM, however, the format of the text message differs (SMS versus IM format).

Further as background information, reference is made to ICSI (IMS Communication Service Identities). An IMS Communication Service Identifier (ICSI) provides a framework for the identification of IMS communication services utilizing the IMS enablers. An IMS communication service is provided via the use of the IMS enablers. At terminals, the use of a communication service identifier is similar to the use of the port concept in TCP/IP, in that it allows applications in a terminal and the network that use SIP for communication purposes to be identified. In the terminal this means dispatching a SIP message to the correct application, and in the network it means selection of the correct application server over ISC. Examples of IMS based applications and communication services are MMTel, OMA messaging and OMA PoC.

One problem with the known techniques is that there is no clear solution for providing SMS in LTE. One problem with the known techniques as for instance outlined above is that additional efforts for system integration are needed. In the known techniques, furthermore, a redesign or adaptation of the applications, services or functionalities is needed in order to support legacy services in new generation networks. The present invention is, amongst others, based on this recognition of the inventors, namely that a solution is required for providing EMS in LTE reusing existing functionalities and minimizing efforts for system integration while avoiding redesign or redevelopment of applications and services.

SUMMARY OF THE INVENTION

It is an object of the present invention to overcome at least some of the technical problems of the prior art. It is furthermore an object of the present invention to provide a network entity, system, method and computer program for handling messages between legacy networks and IP network architecture while minimizing the efforts needed for system integration and maximizing the reuse of existing solutions, services, applications and functionalities.

According to a first aspect the present invention provides a network entity for handling messages in a communications network, the network entity comprising a controller entity and an adapter entity. The controller entity is for providing short message functionalities relating to short messages exchanged according to a radio network interface of a circuit switched network. The adapter entity is for exchanging messages through an IP multimedia subsystem side with an IP multimedia subsystem and for exchanging short messages through a controller side with said controller entity according to said radio network interface. The adapter entity is further configured to perform at least one among adapting messages exchanged through said IP multimedia subsystem side to a first format suitable to be exchanged through said controller side and adapting short messages exchanged through said controller side to a second format suitable to be exchanged through said IP multimedia subsystem side.

According to a second aspect the present invention provides a system for handling user messages in a communications network. The system comprises at least a first network entity for handling call session control functions in an IP multimedia subsystem and a second network entity for handling user messages. The second network entity comprises an IP multimedia subsystem side for exchanging messages with said at least first network entity; a controller entity side for exchanging short message services according to a radio network interface of a circuit switched network; an adapter entity configured to perform at least one among adapting messages exchanged through said IP multimedia subsystem side to a first format suitable to be exchanged through said controller side and adapting short messages exchanged through said controller side to a second format suitable to be exchanged through said IP multimedia subsystem side.

According to a third aspect the present invention provides a method for handling messages in a communications network. The method comprising the steps of exchanging short messages through a radio network interface of a circuit switched network; exchanging messages through an IP multimedia subsystem; and performing at least one among adapting messages exchanged through said IP multimedia subsystem to a first format suitable to be exchanged through said circuit switched network and adapting short messages exchanged through said circuit switched network to a second format suitable to be exchanged through said IP multimedia subsystem.

According to a fourth aspect the present invention provides a computer program for handling messages in a communications network, the computer program comprising instructions configured, when executed on a programmable system, to cause the programmable system to carry out the steps of the method according to an aspect of the invention.

Further advantageous embodiments are defined in the dependent claims. Further examples are provided in the description for facilitating the understanding of the invention and explaining further details and advantages related to the invention.

LIST OF FIGURES

DETAILED DESCRIPTION OF THE INVENTION

Figure 1:
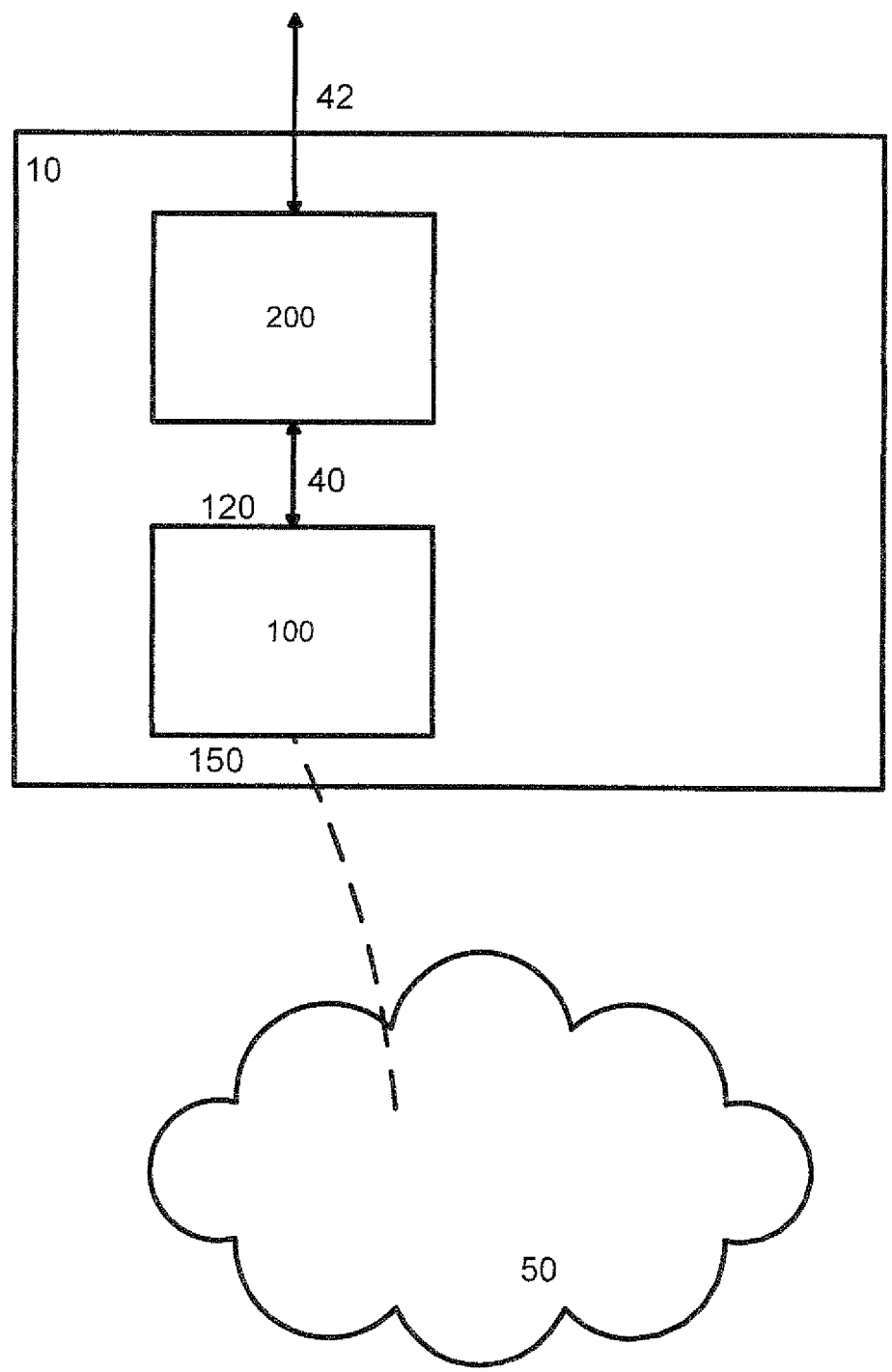
FIG. 1 illustrates a network entity for handling messages in a communications network according to an embodiment of the present invention.

In the following, several embodiments of the present invention will be presented. As it will also be evident from the following explanation, the different embodiments can be differently combined according to the principle of the invention.

In the present invention the term circuit switched network is used to refer to those networks comprising network entities, like network nodes or network devices, suitable to handle circuit switched operations or circuit switched services. As it is known, SMS services are one example of typical CS service which are carried also in packet switched networks (including IP networks, which can carry circuit switched SMS). Typical examples of such networks include GSM, GPRS or UMTS networks. In fact, radio access network nodes (like e.g. a BSC in a GSM network or an RNC in a UMTS network) or core network nodes (e.g. an MSC node) of such networks are capable of handling circuit switched operation or circuit switched services. With reference to a UMTS network, reference is made to those parts of the UMTS network which rely on circuit switched technologies or on nodes handling circuit switched operations or circuit switched services among nodes of the radio access network or among nodes of the core network or between RAN and CN nodes.

In the present invention the term radio network interface is used to refer to an interface of the circuit switched network in the above sense and more specifically to an interface suitable for performing communication involving network nodes of a circuit switched network in the above sense. Thus, a radio network interface according to the present invention is regarded as an interface suitable for performing communication involving at least a network node of a circuit switched network. In one example, a radio network interface is an interface suitable for performing communication involving at least a node of a radio access network (e.g. a Iu interface in a UMTS network; or a A interface in a GSM network). According to another example, the radio network interface is an interface suitable for performing communication between two network nodes of a radio access network (e.g. a Iub interface in UMTS). According to a further example, a radio network interface is an interface suitable for communication between a node of a radio access network and a node of the core network (e.g. a Iu-CS interface in UMTS; similar examples can be made for GSM or GPRS networks). In the case of a GPRS core network, the radio network interface may comprise an interface on which SMS are transported. This interface may be, in the case of a UMTS radio access network, an Iu-PS interface between an RNC and an SGSN node or, in case of a GPRS radio access network, a Gb interface between a BTS node and an SGSN node. Other interfaces of other networks may also be implemented, as for instance the S1 interface on EPS systems.

A first embodiment of the present invention is directed to a network entity and will now be described with reference to FIG. 1 in order to facilitate the understanding of the invention.

The network entity 10 represented in FIG. 1 is a network entity for handling messages in a communications network and comprises a controller entity 200 and an adapter entity 100. A network entity according to the present invention for handling messages may be realized in a variety of examples interchangeable with each other. In one example, the network entity 10 is a network node or a network device; in another example, the network entity 10 may be distributed over several network nodes or network devices or it may be comprised within a network node or network device. The network entity may be implemented in hardware, software or any suitable combinations thereof. In one embodiment of the present invention as illustrated in the following, the network entity 10 comprises a mobile switching centre MSC or at least some of the functionality of an MSC. In another example, the network entity 10 may be embodied in an MSC-S. In a further example, the network entity 10 may be obtained starting from an MSC, or from an MSC-S or from an IMS application server AS as explained later in this specification. According to another example, the network entity 10 may be realized as an MSC application server MSC-AS. In a further example, the network entity may be represented by an SGSN or a modification thereof, when the invention is implemented in a GPRS network for the handling of messages as herein explained. According to further examples, it can be said that a network entity may be based on an MSC, an MSC-S, an SGSN or an MSC-AS or a modification thereof or may comprise an MSC, MSC-S, SGSN or an MSC-AS possibly modified as needed.

The controller entity 200 comprises a component for providing short message functionalities relating to short messages exchanged according to a radio network interface 40 of a circuit switched network. The mentioned short messages may comprise standard SMS messages like those that can be sent from or received at mobile devices or at other computing devices when provided with suitable software application for handling SMS. The mentioned short message functionalities are functionalities related to the handling of short messages and comprise functions like forwarding, switching or providing additional services related to short messages. According to an embodiment described in the following, the short message functionalities comprise at least certain standard functionalities typically provided in an MSC for handling SMS. With this respect, the controller 200, according to a modification of the first embodiment, may comprise those parts of an MSC element handling SMS or the entire functionalities of an MSC. Examples of short message functionalities, especially with reference to an MSC, comprise functions based on CAMEL for SMS standard functions (i.e. services related to SMS as provided through the CAMEL standard). According to another example, the short message functionalities may comprise roaming services when using short messages while roaming. According to a further example, the short message functionalities may comprise charging functions associated to the usage of short messages. Short message functionality may also comprise a lawful interception function for short messages as for instance known in legacy circuit switched networks.

The mentioned radio network interface of a circuit switched network represents an interface among network elements or network nodes of a circuit switched network as explained above. An example of such an interface in an UMTS network is represented by the Iu interface. According to another example, the radio network interface of the circuit switched network may be represented by an interface between a node of a radio access network and a node of a core network. When taking a UMTS network as an example for a modification of the present embodiment, this interface may then be represented by the Iu-CS interface between a radio network controller RNC and MSC node or by a Iu-PS interface between a radio network controller RNC and an SGSN node. We shall notice that even if the interface is called Iu packet switched, still basic transport of an SMS is performed using the container in a Iu-PS channel, which is then transporting the SMS in the same way as on the A or Iu-CS interface. Thus, the invention can also be applied to interfaces like Iu-PS since this is suitable for carrying circuit switched services like SMS. Similar considerations apply to the case wherein a BTS node of a GSM radio access network is connecting to an SGSN node over the Gb interface.

By making reference to a legacy GSM network, the radio network interface according to the present invention may be a radio network interface involving communication among a node of a GSM radio access network like a BSC node and a further GSM network node. The further node may comprise for instance another node of the GSM radio access network, e.g. a BTS node, or a node of a GSM core network like an MSC. In a GSM network an example of such an interface is the A interface or the Abis interface. The skilled person would recognize that other interfaces are suitable as long as they allow communication regarding circuit switched operations or circuit switched services among network nodes.

From what it has been set above, it follows that the radio network interface of a circuit switched network can also involve communication between a radio access network node and a packet switched node as represented by the Iu-PS interface. See also below for further details as to the Iu-PS interface in view of the present invention.

In other words, the radio network interface of a circuit switched network is an interface that involves communication of at least a node belonging to a radio access network according to an example.

The controller entity 200 is an entity capable of handling functionalities related to short messages as typically received or destined to a mobile terminal through the mentioned radio network interface.

The adapter entity 100 comprised in the network entity 10 is an entity for exchanging messages through an IP multimedia subsystem (IMS) side 150. The adapter entity 100 is further arranged for exchanging short messages through a controller side 120 with the controller entity 200 according to the radio network interface 40 above explained. The IP multimedia subsystem side 150 and the controller side 120 represent interfacing parts or components of the adapter entity 100 that allows it to exchange messages or short messages with other entities. It is noted that the messages exchanged through the IP multimedia subsystem side 150 represents user messages like for instance short messages (e.g. SMS) or instant messages IM. According to one embodiment, the messages exchanged through the IP multimedia subsystem side may be included in a session initiated protocol SIP message. The invention is however not limited to such a case, since the mentioned messages may be equivalently exchanged through other protocols allowing establishment and management of communications between two devices in an IMS architecture. The short messages exchanged through a controller side are also user messages like for instance well known SMS messages. The adapter entity 100 is adapted to exchange messages with an IMS architecture represented by reference numeral 50 in FIG. 1. The IMS may be realized as known in the art by conveniently integrating several networks in order to allow user terminals of different types, e.g. mobile or fixed, to communicate with each other or with legacy devices reachable through the network entity 10 and to communicate with the network entity 10 through the interface 42. The interface 42 may represent several interfaces for communicating to other core network nodes like for instance other MSCs (not illustrated). Examples of such interfaces are, in known networks like UMTS networks, the E or G (or also Gd) interfaces. It is noted that the network entity 10 may be further adapted to communicate with RAN network nodes. Such communication may be performed through the interface 40 or through a separate interface (not illustrated) conforming to the same standard as the interface 40 (which is the standard and preferred solution) or conforming to different specifications in cases wherein a dedicated interface for such communication is more suitable.

The adapter entity 100 is further adapted to perform message adaptation. More specifically, the network entity 100 is able to perform adaptation among messages exchanged through the IP multimedia subsystem side 150 to a first format suitable to be exchanged through the controller side 120 and/or adaptation of short messages exchanged through the controller side 120 to a second format suitable to be exchanged through the IMS side 150. In other words, the adapter entity 100 may perform adaptation of user messages exchanged with the IMS 50 through the IMS side 150 into a first format which can be handled by the controller 200. The controller 200 receives the adapted messages through the controller side 120. Such first format may be therefore a format compatible with the above mentioned radio network interface or a format capable of being exchanged over the above mentioned radio network interface. As mentioned above, the adapter entity 100 can be alternatively or in addition further capable of exchanging through the controller side 120 short messages with the controller entity 200 and adapt them into a second format such that the adapted messages in the second format can be exchanged with the IMS 50 through the IMS side 150. According to an example, the second format may then be a format suitable for being carried over a protocol capable of establishing and managing communication within the IMS.

According to one example, the second format is a format suitable for allowing the adapted message to be carried within SIP messages.

In other words, the adapter entity 100 is capable to adapt or convert messages exchanged in an IMS architecture into or from a first format suitable for carrying or exchanging messages over the above mentioned radio network interface.

Thanks to the specific arrangement of the adapter entity 100, messages forwarded to or received from the IMS 50 are, respectively, received at or forwarded by the controller entity 200 over the interface 40 such that those messages appear to the controller entity 200 as received from or forwarded to a mobile terminal accessing a radio access network through the mentioned radio network interface. Thus, the fact that the messages are sent from or received in the IMS domain is transparent to the controller entity 200, which will therefore act as if the message is exchanged directly with a mobile terminal over the radio network interface. The controller entity 200, when receiving messages over the interface 40 or when receiving messages from the interface 42 that are to be forwarded to the interface 40, will therefore handle those messages according to the standard functionalities for messages forwarded by or received at the controller entity 200. Specifically, the controller entity 200 behaves as the serving controller entity for messages received over the interface 40, since those messages are received over the radio network interface 40 and not for instance over a core network interface 42. Similarly, the controller entity 200 acts as the serving controller entity for messages which are to be forwarded through the interface 40 and the adapter entity 100 to the IMS 50, since the controller entity 200 will forward those messages according to a radio network interface 40 and not to a core network interface 42. With reference as example to a UMTS or GSM network, a serving network node represents in fact the node of the core network responsible for performing communications with the RAN node(s) to which the mobile terminal is connected to. Thus, the serving node is responsible for initiating or terminating services that are associated for instance to calls or messages exchanged with the mobile terminals connected to the RAN with which the serving node is in direct communication. A core network node that is receiving messages through a core network interface 42 will instead neither originate nor terminate services related to calls or messages, since those are the responsibilities of serving nodes for those calls or messages.

In one example as also explained in more detail in the following, when the controller entity 200 comprises at least a part of the functionalities of a standard MSC, it will behave as the MSC serving a fictitious mobile terminal. The fictitious mobile terminal is obtained through the adapter entity 100 that will covert messages in a radio access network interface, such that those messages appear as corresponding to a mobile terminal.

In one example, the short message functionalities comprise functionalities related to services based on CAMEL standard. Thus, the controller entity 200 may implement CAMEL functions related to SMS. As known, CAMEL services are originated or terminated at the MSC serving the mobile terminal. Thanks this arrangement, the controller entity implementing the CAMEL functionalities would be the serving MSC for any user device physically located in the IMS 50 but accessing the controller entity 200 through the adapter controller 100 and the interface 40. Therefore, the controller entity 200 implementing CAMEL functionalities (as for instance reused from an existing MSC) will invoke CAMEL services (or originate CAMEL services) for those messages received through the interface 40 from the adapter entity 100; the controller entity may further terminate CAMEL services for those messages to be forwarded to the adapter entity 100 or the interface 40. In this way, standard CAMEL services as typically available in a standard MSC can be originated and terminated also for messages actually sent from or destined to user devices in the IMS 50. The advantages consist in that thanks to the specific arrangement of the adaptive entity 100 it is possible to reuse existing CAMEL functionalities without any need for further system integration, redesign of existing functionalities or development of new services. Therefore, the advantage of the invention can be achieved in that efforts for system integration and development can be minimized when adapting exchange of messages between a legacy network like a GSM or UMTS network and IP multimedia subsystem. Thus, the resulting network entity or system has a simple to implement structure. This is once again made possible thanks to the specific arrangement of the adapter entity 100 capable of adapting or converting messages to/from an IMS 50 to a radio network interface as explained above.

The above examples have been made with reference to short messages sent from or received at mobile devices in the IMS 50. The same considerations apply however also to the case wherein the user device of the IMS 50 would send instant messages (IM) to a user device of a legacy network. The IM message is thus delivered to the adapter entity 100 that will adapt or convert in a short message to be delivered to a mobile user in the legacy network through the interface 40 and the controller entity 200. Similarly, short messages belonging to an IM session with an IMS user device will be received as short messages at the controller entity 200, forwarded through the interface 40 to the adapter entity 100 and here transmitted as IM messages to the IMS device. In this way, services like charging for the use of short messages can be conveniently performed, i.e. initiated or terminated, by the controller entity 200.

The above considerations made with respect to CAMEL services also apply to other existing functionalities or services already present in legacy networks. For instance, by making further reference to the example wherein the controller entity 200 may implement functionalities of an MSC, further functionalities that can be reused while minimizing the efforts for system integration are for example charging services related to the usage of SMS; roaming services when using SMS; lawful interception for SMS; etc. . . . . Reference is also made to following parts of this specification describing further details with this respect.

Moreover, the present invention is not only applicable to SMS as discussed in the above examples but also to other types of messages like instant messages as mentioned above with reference to the first embodiment depicted in FIG. 1. In the case of instant messages, in fact, the adapter entity 100 is configured to adapt or convert instant messages received from or destined to a user device in the IMS 50 into short messages to be exchanged with the controller entity 200 over the interface 40. Therefore, the controller entity 200 may implement legacy functions as above explained by several examples also for instant messages exchanged with a user device (not illustrated) provided within the IMS 50.

To the contrary, the prior art techniques perform a conversion of messages exchanged with an IMS to/from a core network interface of a circuit switched network. In such a case, it is not possible to originate or terminate functionalities as those provided by the CAMEL standards. In fact, as known in the art and explained above, CAMEL services as well as other legacy services implemented in the serving controlling entity cannot be originated (i.e. invoked) or terminated at a core network node of the circuit switched network not communicating with the RAN to which the mobile terminal is attached to. In fact, it can be said that the trigger for originating or terminating services relating for instance to calls or messages is represented by the reception or the forwarding of messages to a mobile terminal over a radio network interface 40 and not over a core network interface 42. The prior art would suffer from the disadvantages mentioned in the opening part of the present specification since it is therein not possible to automatically originate or terminate services as found by the inventors after careful considerations and investigations. In other words, in the prior art a redesign or adaptation of existing services or the development of new services is needed in order to provide the same functionalities, such that thus result in increased efforts and in a more complex system. To the contrary, the present invention provides a simple and at the same time effective solution.

According to a modification of the present first embodiment, the radio network interface may comprise an interface between a radio access network node and a core network node. Examples of radio access network nodes are a Node B or a radio network controller RNC when taking an UMTS network into consideration. In a GSM network, a radio access network node comprises a BTS or a BSC. An example of a core network node is an MSC. Therefore, when referring to a UMTS in one example, the radio network interface may be an Iu interface as defined in the ETSI standards. According to another example, the radio network interface may be more specifically an Iu-CS interface between an RNC and an MSC or an Iu-PS between an RNC and a SGSN. According to another example, the radio network interface may instead be an Iub interface between a node B and an RNC. When taking the GSM network as example, the radio network interface may be an A interface or Abis interface.

In one example, the network entity according to the first embodiment may perform one amongst originating and terminating services or applications relating to the short message received over the radio network interface. In other words, the network entity (in one example, the controller entity within the network entity) upon receiving short messages from the IMS side through the radio network interface 40 may originate services or application related to the received message. For messages that are to be forwarded over the radio network interface 40 in order to be delivered for instance to a terminal in the IMS network, the network entity (or the controller entity) will terminate the corresponding services or applications. As mentioned in other parts of this specification, those services or applications can be by—way of example—those conforming with CAMEL standards, those relating to charging, lawful interception, etc. . . . . Thus, in one example, the controller entity may start a charging application or service for a short message received from the interface 40 and destined to a terminal in a GSM, UMTS or GPRS network. Similarly, it will terminate services relating to a short messaged received from a GSM, UNITS or GPRS terminal and relating to charging for those messages, when those messages are to be forwarded through the radio network interface 40 to an IMS terminal.

The first format according to the first embodiment of the present invention may comprise a format for a user message in accordance with SMS standards exchanged over one of the above mentioned radio network interfaces. SMS are well known in the art and comply with several standards. TS 24.008 is one of them, which is here provided as mere example. The SMS according to the present invention is not restricted to the functionalities mentioned in this standard since reference is made to what is generally referred by SMS, thus comprising also other standards or specifications as the skilled person would recognise applicable to SMS.

The second format according to the first embodiment may optionally comprise a format in accordance with short user messages exchanged over the IMS. The second format may also comprise a format in accordance with instant messages exchanged over the IMS. It is noted that the IMS refers to a network architecture and that therefore the current formats used for short messages or instant messages depend on the current network implemented in the IMS and carrying those messages.

Figure 5:
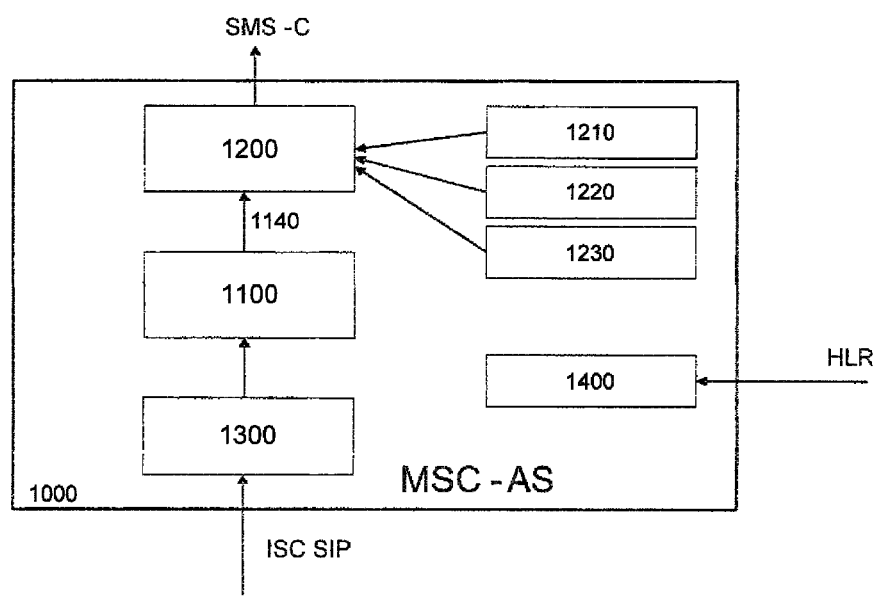
FIG. 5 illustrates a block diagram of an MSC-AS according to an embodiment of the present invention.
Figure 6:
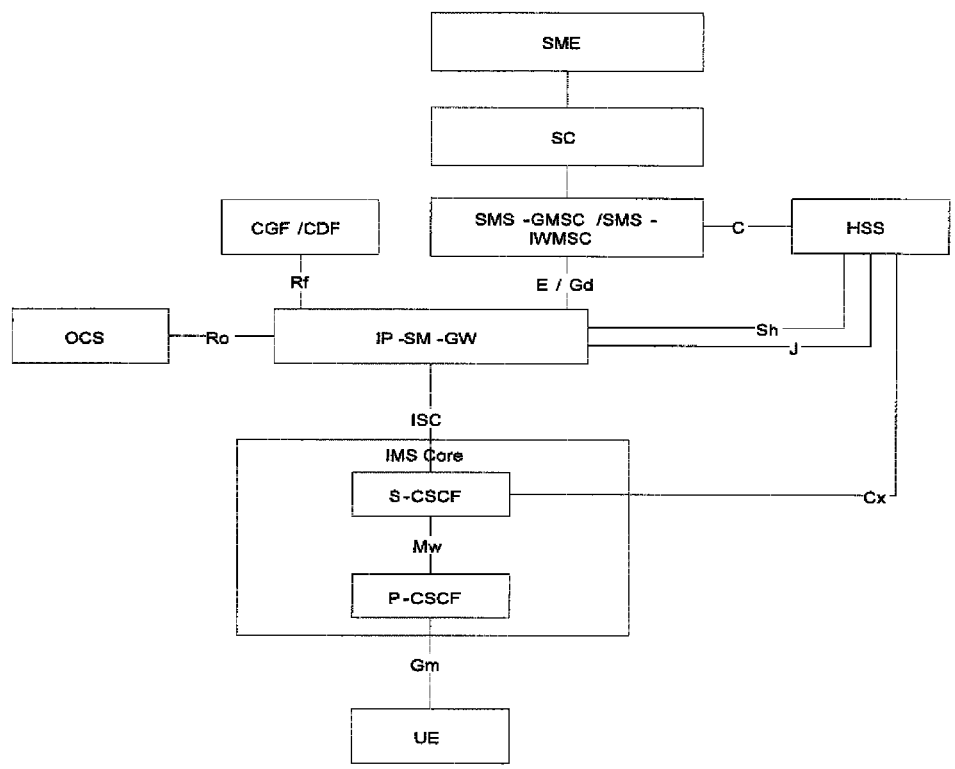
FIG. 6 illustrates an SMS over IP architecture according to the prior art.
Figure 7:
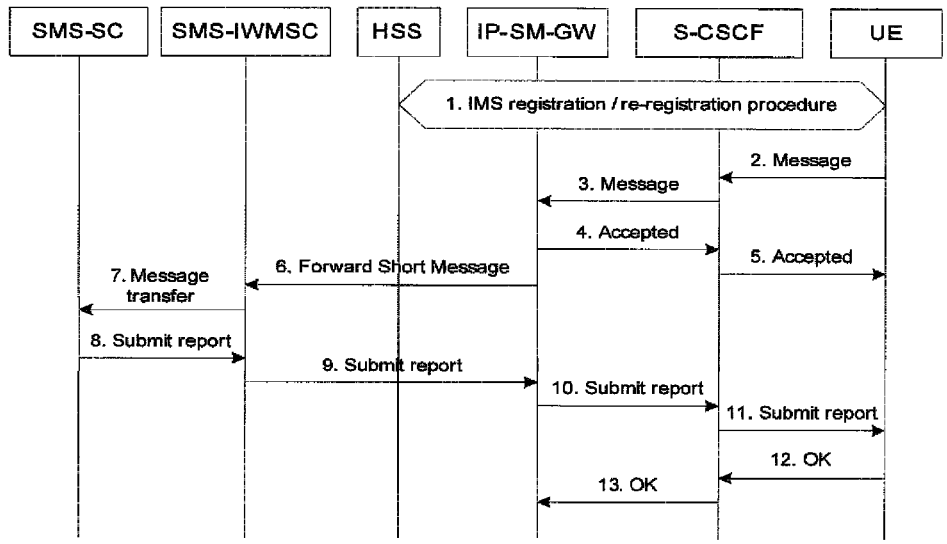
FIG. 7 illustrates handling of subscriber initiated SMS according to the prior art.
Figure 8:
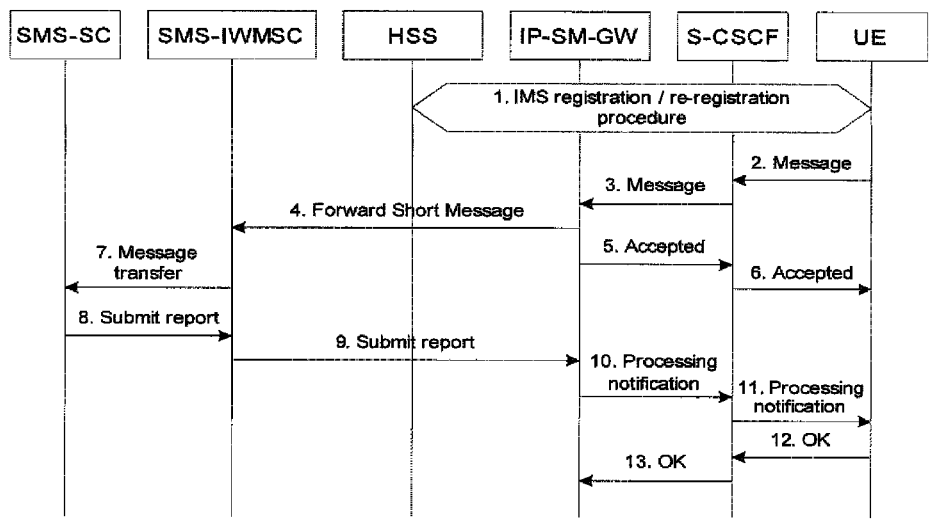
FIG. 8 illustrates interworking of instant messaging with SMS subscriber initiated according to the prior art.

The network entity according to the first embodiment may optionally comprise a protocol stack handler not depicted in FIG. 1) for handling at least a subset of protocol functionalities wherein the subset of protocol functionalities comprises at least functionalities relating to exchange of messages over the IMS 50. An example of such configuration is also depicted in FIG. 5 as discussed in the following, illustrating an MSC-AS representing an example of a network entity 10 according to this embodiment, wherein the protocol stack handler is represented with reference sign 1300. It is noted that the optional protocol stack handler is also not needed to be implemented separately from other entities or components of the network entity 10. In fact, according to another example, the protocol stack handler may be comprised in the adapter entity 100. The protocol functionality implemented by this protocol stack handler comprises in one example a subset of SIP functions for handling messages within the IMS 50. Optionally the subset of the SIP functions implemented may comprise short messages and/or instant messages and/or other functions related for instance to voice. The invention is also not limited to the implementation of a SIP protocol stack, since also other protocols would be suitable for the application of the present invention as long as they are capable of establishing and managing communication within an IMS.

The network entity 10 according to the first embodiment or according to its further example or modifications above described may be further configured such that the controller entity is capable of providing short message functionalities comprising short message functionalities relating to short message applications specific to the circuit switched network. In other words, the controller entity 200 may optionally implement some functions related to applications suitable for providing short message services wherein these applications may be typical or standard applications already available for a circuit switched network (in the sense explained above). The short message functionalities relating to short message applications above mentioned comprise in one example applications developed according to the CAMEL standard as for instance available for legacy radio networks. Therefore, the controller entity 200 implementing applications based on CAMEL standards may originate (e.g. invoke) or terminate those CAMEL applications upon receipt of messages from the network interface 40 (i.e. messages received from the IMS 50 and converter by the adapter entity 100) or upon receipt of short messages to be forwarded to the network interface 40. In fact, once again, the controller entity 200 is in this case the serving node for the messages to be exchanged over the interface 40; thus messages exchanged (or to be exchanged) over the interface 40 trigger the execution of applications like those developed according to the CAMEL standard. The advantage of such a configuration consists in that it is possible to reuse CAMEL applications available at the network entity 10 and which have been developed for usage with short messages exchanged over the interface 40 or for being exchanged directly with mobile terminals like GSM or UMTS mobile terminals over a radio network interface Iu. In this way, it is possible to minimize efforts for system integration also when making interworking of messages between legacy networks and IMS architectures. Again, the above example has been made with reference to CAMEL services. However, the invention would equally apply to other functionalities like for instance charging for the usage of short messages, lawful interception, etc. . . . as also explained later in this specification.

The controller entity 200 of the network entity 10 according to the first embodiment may optionally be configured for providing short message functionalities relating to charging for short message services wherein the charging is specific to the circuit switched network. For instance, in those examples wherein the circuit switched network is a GSM network or a UMTS network (again, within the meaning of the present invention, it is referred to those parts of the UMTS network which handle all the circuit switched operations or circuit switched services between network nodes belonging for instance to the RAN or CN). In this way, charging functionalities which are typically initiated (i.e. invoked) or terminated at a network entity 10 (like in one example an MSC), upon exchange of messages with a radio network interface (like an Iu interface) can be directly reuse. In fact, the messages exchanged over the interface 40 appear to the controller entity 200 as being exchanged directly with a mobile terminal. Consequently, a simple and effective solution can be provided for handling messages between legacy and IMS networks.

Moreover, thanks to the network controller entity providing further short message functionalities, it is not needed, in contrast to prior art techniques, to contact the HSS within the IMS since the HLR can be directly contacted by the network entity 10. The HLR can be contacted for instance through the controller entity 200 or through further non depicted components. In general, therefore, a more streamlined operation is possible since messages coming from or destined to the IMS are converted into a format compatible with a radio network interface (e.g. Iu or A) thus allowing full re-usage of existing functionalities and procedures minimizing efforts for redesign.

Other functionalities that may be implemented in the network entity 10 (for instance in the controller 100 or in further components not depicted in FIG. 1) may be functions related to the lawful interception for SMS. The controller entity 200 in such an example would detect messages exchanged over the interface 40 as equivalent to messages to be exchanged directly with a mobile terminal over a radio network air interface (e.g. Iu interface in one example) and would thus be able to use already available lawful interception services or applications already present in the legacy network like GSM, GPRS or UMTS networks. Further details will also be given in the following with reference to the embodiment depicted in FIG. 5.

In an optional variant of the network entity according to the first embodiment and the above illustrative modifications, the network entity 10 may further and optionally comprise a determination entity (not depicted in the figure) for determining whether messages exchanged with the IMS are user messages. In the present example the determination entity is a separate entity. However, it is also possible to integrate its functionalities or implement its functionalities within another entity like the adapter entity 100 or the controller entity 200. User messages correspond to messages as composed by a user or as directed to a user of any device capable of any communications over a network. Such messages are therefore distinguished from signalling messages. Therefore, the determination entity or a suitable adapter entity 100 providing this determining function is able to distinguish among user messages and signalling messages exchanged in the IMS 50. Thus, thanks to this arrangement, the network entity 10 may be able to process only those messages exchanged with the IMS 50 which relate to user messages. Examples of user messages are short messages like SMS or instant messages IM. The determination can be performed in different ways as evident to the skilled person. For instance, the determination may be performed by passing any messages received by the IMS side 150 in case the determination entity is implemented in the converter entity 100. By passing the message, it is possible to distinguish whether it comprises or it corresponds to a user message or whether it relates to a signalling message.

According to another example, the determination whether messages exchanged with the IMS system 50 are user messages can be performed through dedicated fields present in the packets or messages exchanged with the IMS 50. According to a further example, as detailed also in the following, an already existing field of SIP messages may be used like the ICSI field. Typically, ICSI identifiers are used for determining an application to which a given SIP message is directed to or intended to. In case a dedicated ICSI values are used to identify an SMS service or an IM service, then the corresponding functions may be called for converting this message at the converter entity 100 in order to perform the conversion to/from the interface 40. Furthermore, the type of user message can also be determined; thus the converting entity 100 can distinguish among SMS, chat messages, MMS, EMS, IM or other messages.

According to a further implementation detail of the network entity 10 according to the first embodiment, the network entity 100 may be further configured to communicate through the IP multimedia subsystem side 150 with at least one call session control function entity provided in the IMS 50. The call session control function entity is a component or a plurality of components for handling and controlling call sessions in an IMS. In one example, such entity may be embodied in a CSCF node as standardized or as conveniently modified according to the needs. A communication between the adapter entity 100 through the IMS side 150 and the call session control function entity may be performed according to a suitable IMS interface or protocol for exchanging messages or packets between a CSCF and an access server AS. In one example, the ISC interface may be used. According to one example, if the network entity 10 is implemented within an MSC application server (MSC-AS), the CSCF and the MSC-AS can communicate directly through the ISC interface. In other prior art techniques, to the contrary, this communication is only possible through different core network interfaces like the E/Gd interface. Therefore, when implementing the network entity of the first embodiment in an MSC-AS, any CSCF node of an IMS system would see the MSC-AS as a standard application server and would be able to directly communicate with this without further changes or adaptations. Therefore, users of the IMS system see users of a legacy network (like a GSM, GPRS or a UMTS network communicating with the IMS through the network entity 10) as standard IMS users. In other words, legacy user devices like GSM, GPRS or UMTS mobile terminals are seen from any network device or any user device of the IMS network as a standard IMS user device.

At the same time, IMS user devices appear to legacy user devices of a legacy network (like a GSM, GPRS or a UMTS) as standard user devices (respectively, as GSM, GPRS or UMTS user devices). Thus, the present invention achieves full interoperability when exchanging messages between users among legacy and IMS networks while minimizing efforts for system integration, redesign and development.

Moreover, the network entity according to the present invention can be seen on the IMS network side as an IMS application server while it can be seen as a standard MSC or MSC-S from a legacy GSM, GPRS or UMTS network side.

According to a further example of the first embodiment the network entity 10 may further comprise circuit logic for informing a home location register HLR (both the circuit logic and the home location register not depicted in FIG. 1) that the subscriber is suitable for short message services over the IP multimedia subsystem. Such information will indicate the legacy network like a GSM or a UMTS network or components thereof that this subscriber is reachable for SMS services or IM services over the IP multimedia subsystem side 150 of the adapter entity 100. In other words, messages directed to such a subscriber are forwarded to the network entity 10 which will in turn perform the necessary adaptation or conversion. The same information on the home location register can be used for messages received from the IMS 50 over the IMS side 150 of the adapter entity 100. Further details as to perform operations involving the HLR (like for instance performing CS ATTACH) will be explained later in this specification. As explained in those following parts, thanks to the circuit logic establishing communication with the HLR, it is possible to provide a network assisted setting for configuring delivery of messages.

The above examples or modifications of the first embodiment are optional as explicitly said or as implicit to the reader. Furthermore, the combinations of any of the above described examples or variations of the first embodiment can be combined with each other as necessary since they represent optional features of the first embodiment that can interoperate with each other without further modifications.

Figure 2:
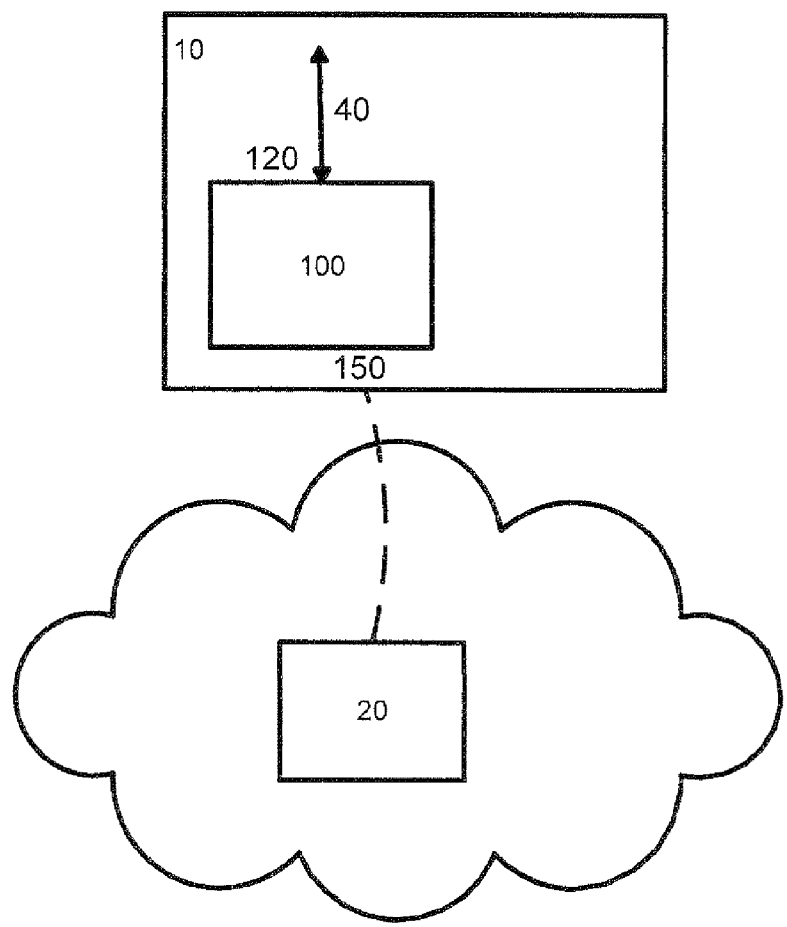
FIG. 2 illustrates a system for handling user messages in a communications network according to an embodiment of the present invention.

Reference will now be made to FIG. 2 depicting a second embodiment of the present invention directed to a system for handling user messages in a communications network. The system comprises a first network entity 20 and a second network entity 10.

The first network entity 20 handles call session control functions in an IMS system. Call session control functions are those functions responsible for establishing connections for communications between user devices, wherein the communication can be voice, messages like SMS or IM, packets exchanged between applications, exchanged multimedia content, etc. . . . .

The second network entity 10 is an entity for handling user messages and comprises an IP multimedia subsystem side 150 for exchanging messages with the first network entity 20.

The network entity 10 further comprises a controller entity side 120 for exchanging short message services according to a radio network interface of a circuit switched network and an adapter entity 100 configured to perform adaptation of messages. More specifically the adapter entity 100 performs adaptation of messages exchanged through the IP multimedia subsystem side 150 to a first format suitable to be exchanged through the controller side 120. The adapter entity 100 may be further configured to adapt short messages exchanged through the controller side 120 to a second format suitable to be exchanged through the IP multimedia subsystem side 150.

The IMS side 150 and the controller entity side 120 can be realized as components of the network entity 10 or components of the adapter entity 100 for exchanging messages respectively with the first network entity 20 or with a radio network interface of a circuit switched network. The same considerations made in the first embodiment with reference to the radio network interface or to the circuit switched network also apply here. Similarly, with reference to the user messages, first or second formats and other terms herewith described, the same considerations apply as already made with reference to the first embodiment. Therefore, reference is made to the above considerations for those parts of the system of the second embodiment which are the same as those described with reference to the first embodiment.

Optionally, the system according to the second embodiment may comprise a controller entity for providing short message functionalities relating to short messages exchanged according to the radio network interface of a circuit switched network. Therefore, the optional controller entity of the system of the second embodiment may have the same characteristics as explained above with reference to the first embodiment.

The adapter entity 100 and the optional controller entity 200 may be implemented within the same second network entity 10 or in separated network entities.

The system according to the second embodiment achieves the same advantages as described above with reference to the first embodiment, by allowing a transparent adaptation of messages exchanged in an IMS network to messages exchanged according to a format suitable for transmission over a radio network interface involving at least one node of an RAN. Examples of such interfaces have been provided above and apply as well to this embodiment, as well to other embodiments and variations thereof. Consequently, the network entity 10 can be regarded as a serving network entity for messages exchanged with an IMS system. A serving network entity is to be regarded as a network entity capable of exchanging user messages directly through a radio network interface involving at least one node of a radio access network RAN on one side and exchanging messages with other nodes of a core network of a radio access network. A serving network entity can therefore be regarded as an entry point for messages received from the IMS or as a termination point for messages directed to an IMS. Due to these characteristics, the serving network entity typically implements services related to the communication activities like voice or messaging. In the specific case of user messages, the serving network entity originates (i.e. invokes or initiates) respective services upon receipt of adapted messages (originally received from the IMS and thereafter adapted to the interface 40) and terminates services for messages that need to be adapted in a format suitable to be exchanged with the IMS. Those services are typically implemented in the network node 10 (in one example in the controller entity 200). These functionalities as well as examples of those functionalities have been provided with reference to the first embodiment and apply also here (see CAMEL, charging, lawful interception, etc. . . . ).

As mentioned above, the radio network interface 40 comprises an interface between a radio access network node and a core network node. More in general, the radio network interface comprises an interface which involves communication between at least a radio access network node and a further node which can be comprised either in the radio access network or in the core network.

Figure 3:
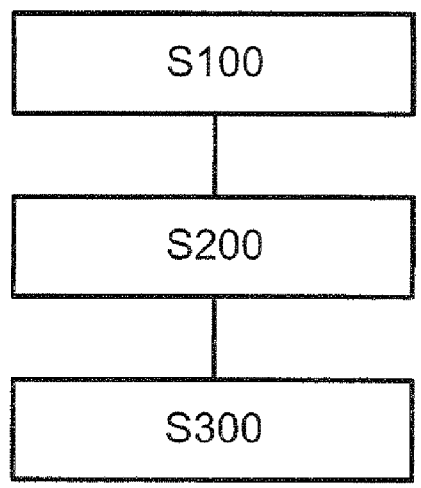
FIG. 3 illustrates a flowchart representing a method for handling messages in a communications network according to an embodiment of the present invention.

Reference will now be made to FIG. 3 illustrating a method for handling messages in a communications network according to a third embodiment of the present invention. FIG. 3 is a flowchart representing different steps of the method, wherein the steps can be implemented as processes running in parallel software implementation or hardware implementation. The parallel implementation however is not the only one foreseen, since those steps or processes could also share the same resources (e.g. the same processor, memory and other required components), and wherein each process or step is assigned the resources in a scheduled manner or in an as needed basis.

More specifically, the method depicted in FIG. 3 foresees the step S100 of exchanging short messages through a radio network interface of a circuit switched network.

In step S200, the method foresees exchanging messages through an IP multimedia subsystem. Finally, in step S300 the method foresees performing message adaptation. More specifically, step S300 performs adaptation of messages exchanged through the IP multimedia subsystem to a first format suitable to be exchanged through the circuit switched network.

At step S300 the method may also perform adaptation of short messages exchanged through the circuit switched network to a second format suitable to be exchanged through the multimedia subsystem.

With reference to the radio network interface, circuit switched network, first and second formats as well as for the remaining used terms, similar considerations as made with reference to the first and second embodiments apply here, to which it is referred.

In one example, the mentioned radio network interface may comprise a radio network interface for allowing communication among one network entity (e.g. a network node or a network element) of a radio access network RAN and at least another network entity, wherein the other network entity can be the further network entity of the RAN or a network entity of a core network CN. The RAN and CS can be part of legacy GSM, GPRS or UMTS networks. As already explained above, the present invention refers to circuit switched network and implies that reference is made to those networks which handle circuit switched operations or circuit switched services through at least some of the nodes therein comprised.

In one example, the method according to this embodiment may further comprise the step of performing one amongst originating and terminating services or applications relating to the short message received over the radio network interface. Similar considerations made above with reference to the first embodiment apply here. In other words, the method foresees, upon receiving short messages from the IMS side through the radio network interface 40, originating services or invoking applications related to the received message. For messages that are to be forwarded over the radio network interface 40 in order to be delivered for instance to a terminal in the IMS network, this steps performs termination of the corresponding services or applications. As mentioned in other parts of this specification, those services or applications can be by—way of example—those conforming with CAMEL standards, those relating to charging, lawful interception, etc. . . . . Thus, in one example, the method may start a charging application or charging service for a short message received from the interface 40 and destined to a terminal in a GSM, UMTS or GPRS network. Similarly, it will terminate services relating to a short messaged received from a GSM, UMTS or GPRS terminal and relating to charging for those messages, when those messages are to be forwarded through the radio network interface 40 to an IMS terminal.

Also the third embodiment achieves the same advantages as already explained above.

According to a forth embodiment, the present invention provides a computer program for handling messages in a communications network wherein the computer program comprises instructions configured, when executed on a programmable system, to cause the programmable system to carry out the steps as depicted for instance in FIG. 3 or as described above with reference to the third embodiment.

A programmable system is represented by any device which comprises at least a processor for executing the mentioned instructions and storage entities for storing the instructions to be provided to the processor for execution. Any kind of hardware like general purpose processors, DSP, FPGA, ASIC etc. . . . is suitable for implementing a processor of such a programmable system. The storage entity may be realized by a single component like a memory or a hard disk or by a combination of different memory elements, comprising for instance memories and/or hard disks, capable of storing instructions and/or data. By the execution of the computer program, the advantages already discussed with reference to the above embodiments can be equally obtained.

The network entity according to the present invention as explained above with reference to the several embodiments can be put into practice in several ways. In one example, the network entity may be implemented in an MSC or in an MSC-S by providing one of these devices as known or available in the art with the additional functions as for instance the adapter entity or optionally the stack handler entity described above. The controller entity above described would therefore correspond to the component or plurality of components already present in an MSC or MSC-S and which provide functionalities related to mobile terminals like GSM, GPRS or UMTS mobile terminals.

In other words, the network entity according to the present invention could be implemented as an improvement or as an adaptation of an existing MSC or an existing MSC-S. The resulting network entity may be a network device or a plurality of network devices wherein the several functionalities are conveniently distributed. As explained above, such device would appear as a standard MSC or MSC-S from the radio access network side or core network access side of a GSM, GPRS or UMTS network (though the same applies to other networks comprising device(s) capable of handling circuit switched operations or circuit switched services) and at the same time it would appear as an application server from the IMS side. Such a device would then be seen as a MSC-AS device, i.e. as an MSC application server entity.

According to another embodiment, the network entity according to the present invention may instead be realized when starting from an application server and adding to this application server the network entities for adapting messages and a controller entity for providing short message functionalities as explained above. Therefore, such network entity may be obtained by modifying or adapting an existing access server in order to obtain an MSC-AS. Also such network entity would appear as a standard MSC or MSC-S from the side of the radio network access or core network of a circuit switched network and will at the same time appear as an application server from the IMS side.

In the following, an example will be provided showing how a network entity according to the present invention can be realized in order to obtain an MSC-AS providing the advantages of the present invention.

Figure 4:
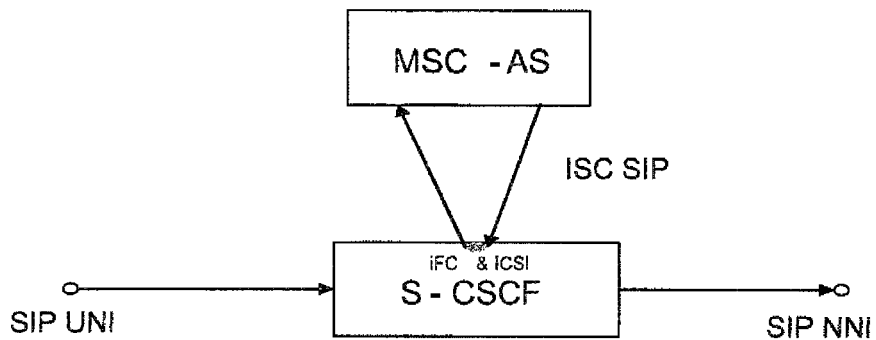
FIG. 4 illustrates a basic architecture according to an embodiment of the present invention.

FIG. 4 shows schematically how messages are exchanged between a S-CSCF element of an IMS network and an MSC-AS according to the present invention. As it can be seen, the S-CSCF element is capable of exchanging SIP messages on a SIP user network interface or on a SIP network to network interface. At the same time, the S-CSCF element is capable of exchanging ISC SIP messages with the MSC-AS according to the present invention. In the specific example, ISC SIP messages are selected, though also other protocols may be implemented as long as they are capable of exchanging messages between an S-CSCF element and an application server element.

As mentioned, there are different alternatives to provide in IMS architecture an application server suitable for handling messages. One possibility is to build a new application server and to rebuild the services that are needed. Another possibility is to turn the existing MSC-S in an application server for messages. Such a node may comprise the following characteristics:

MSC-AS may be regarded as an MSC-S node that can also act as message application server in the IMS architecture.

The MSC-AS may handle third party SIP Register and SIP Invite from the IMS core for message handling—it sits on the ISC reference point.

In addition to the message related SIP methods the invention may add also send/receive SIP Message signalling from IMS core to MSC-AS.

This may be arranged by setting the filter criteria in S-CSCF.

Thanks to the invention it is thereby possible to reuse the existing SMS capabilities of the MSC and to provide services related to SMS in an effective and simple manner.

A SIP Message may be forwarded from S-CSCF using the IFC towards the MSC-AS. FIG. 4 shows an exampled of a proposed high level architecture according to the invention. The SIP message (including the encapsulated SMS or just the text as payload) may enter the MSC-AS via the ISC interface.

FIG. 5 represents an example of an MSC-AS according to the present invention. The MSC-AS 1000 of FIG. 5 represents an example of the network entity 10 of FIG. 1 and described above with reference to the several embodiments. The component 1200 represents an example of implementing the controller entity 200 described in the above embodiments and implements in this example at least a subset of the standard SMS functionalities of an MSC or of an MSC-S. In another example, not depicted, the controller entity 200 may implement standard functionalities of an SGSN in order to allow handling of messages according to the present invention also in a GPRS network. The existing functionalities may be integrated within the element 1200 or may be provided by further additional and optional elements 1210, 1220 and 1230. In the depicted example, the element 1210 is adapted to provide CAMEL for SMS functionalities. The element 1220 is configured to provide charging for SMS functionalities, while the element 1230 is adapted to provide lawful interception far SMS functionalities. According to the implementation, none of them, one or more of those functionalities may be implemented. Furthermore, non depicted functionalities may also be implemented in the element 1200 or may be added to the MSC-AS as additional elements in order to be reused by the element 1200. The element 1200 can be regarded as a legacy element suitable for performing standard or available functionalities of an SMS or of an SMS-S or for interfacing with those standard or available functionalities as available through other elements 1210-1230 of from external elements or nodes.

The MSC-AS of FIG. 5 then comprises a converter 1100 which represents an example of implementation of an adapter entity 100 according to the present invention as described in the above embodiments. The converter 1100 therefore performs adaptation of messages to/from a SIP message format from/to, respectively, a short message in an SMS format. The SIP message format is an example of the second format above described, i.e. it is a format suitable for exchanging messages over a SIP protocol message or a packet in IMS.

The SMS format is instead an example of the first format above introduced and in the present example represents a format suitable for transmitting short message services SMS according to a radio access network interface like the Iu of an UMTS network or a A interface of a GSM network.

The MSC-AS further comprises a SIP stack message handler 1300 representing an example of implementing the optional protocol stack handler described with reference to the above embodiments. The SIP stack message handler is therefore capable of receiving SIP messages like ISC SIP messages exchanged with the IMS.

It is noted that the interface 1140 between, the converter 1100 and the element 1200 is a radio network interface like an Iu interface in a UMTS network or a A interface in a GSM network. Therefore, IMS messages are converted to SMS messages which are received at the element 1200 representing the standard functionalities of an MSC as if they would be sent from or received by a legacy mobile terminal like a GMS, GPRS or UMTS mobile terminal.

The MSC-AS of FIG. 5 further includes a CS subscriber data element 1400 capable of exchanging information with an HLR.

In the following, further examples relating to the network entity of the present invention or to the illustrative MSC-AS above introduced will be explained.

The message converter (representing an example of the adapter entity 100 of FIG. 1 or of the above embodiments) in the MSC AS may do a conversion from the SIP message into the SMS message format (and vice versa for terminating SMS; the SMS message format and SIP message are examples of the first and second format according to the invention as explained in the above embodiments). The existing SMS functionality in the MSC-AS would be used for further processing, e.g. for processing services related to the usage or forwarding of SMS.

It is noted that the example of the network entity of FIG. 5 has been denoted as MSC-AS to signify that it is seen from the IMS side as an application server implementing the functionalities of an MSC. As seen, however, the MSC-AS may also provide functionalities of an MSC-S or of an SGSN node (see also above, the controller entity 1200 may implement—according to circumstances—MSC, MSC-S or SGSN functionalities). Thus, in such cases the device depicted in FIG. 5 may well be called an MSC-S-AS or an SGSN-AS indicating that the entity is seen from the IMS side as an application server providing, respectively, the functionalities of an MSC-S or SGSN. From the core network side of the circuit switched network, the device of FIG. 5 would then be seem as, respectively, an MSC-S or SGSN according to these two further examples.

The network entity of the present invention may be further adapted to comprise further functionalities as in the following.

Since the SIP Message is less restricted in size than an SMS, the MSC AS may perform also concatenation of messages split over more than one SMS into one SIP message. This may optionally be implemented in the adapter entity 100.

Since the SIP Message is less restricted in size than an SMS, for an originating SIP Message, the MSC AS can perform a split function of one SIP Message into several outgoing SMS. This may optionally be implemented in the adapter entity 100.

The network entity of the present invention (or the MSC-AS in one example) may further be adapted to take into consideration SMS-CS subscriber data as available in legacy circuit switched networks. Based on the CS subscriber data an MSC-AS may perform:

barring analysis (operator determined barring and also Barring Supplementary Service)

CAMEL triggering, also using the existing CAMEL Service Environment (reuse of existing CAMEL services), e.g., for group SMS SMS Prepaid support reuse the MSC-AS Interception access point for lawful interception (LI).

reuse the MSC-AS charging interface (post processing/billing).

The above listed functionalities (noting that the list is non exhaustive, since further existing functionalities may be equally re-used) may be implemented in the controller entity 200 of FIG. 1; according to the example later depicted in FIG. 5, those functionalities may be implemented in the component 1200 or in the components 1210-1230 as more convenient, which would then inter-operate with the legacy component 1200 as suitable.

In one optional implementation, it is possible to use a dedicated ICSI to identify SMS service, i.e. to invoke the MSC-AS for SIP messages and to inform the MSC-AS that it has been invoked for SMS service when a dedicated ICSI is determined to be present (see also above discussion with reference to this aspect). However, the MSC-AS can be invoked also without referring to the ICSI: in fact, according to a different example, it is possible to identify the SIP message as an SMS (or an IM, EMS, MMS, etc. . . . ) message, based on target address and/or by parsing the SIP message.

The MSC-AS can also add into the SIP message further information that is normally not possible to carry in SMS, like a message counter (number of messages send and/or received in total, e.g. today etc). The message counter can be stored in subscriber data by the MSC-AS or by an external device according to circumstances.

In case a service indicator is used to signal to the S-CSCF that a SMS is sent in the SIP MESSAGE, then the UE and the MSC-AS indicate to each other the type of message exchange it case more than one have to be supported, e.g. it is possible to differentiate between SMS, Chat and, MMS, IM, etc. . . . . The IMS Communication Service Identifier may be used for that purpose. Namely, it may be used as in the following:

In the MSC AS and UE, to find the correct application (if there are multiple);

The MSC AS may use the ICSI to differentiate between the roles "Telephony Server" and "Messaging GW";

In the S-CSCF it may be used to invoke the correct AS.

For terminating SMS/SIP Message support, the MSC AS needs either:

To perform CS attach to inform the HLR/HSS that the subscriber is reachable for SMS via this MSC AS or [this may be a new functionality for an MSC-AS with respect to SMS];

to use the J or Sh interface towards the HLR/HSS as specified in TS 23.204 (clause 5.2.3) to register from the MSC-AS to the HLR/HSS for SMS delivery (thus, in this way a further existing functionality may be adapted or extended).

In case of CS attach, the HPLMN operator may need to support simultaneous CS attach from multiple devices, i.e. the user may be reachable with the same MSISDN on up to three devices (three seems to be the maximum in current deployments, however, this is an implementation choice to cover the use case normal phone e-mail specific device+laptop in which three SIMs are needed. The present invention may however be used also in case more than three devices are supported).

In case the user is IMS registered also for text, the MSC-AS may indicate (e.g. using a USSD message) to the HLR that SMS shall be delivered via the MSC-AS and not via other MSC Servers the user might be attached to (e.g., in case the UE is camping on LTE and CS Fallback is enabled).

In case the IMS registration expires or the UE has performed de-registration, then The MSC AS may preferably remove this preference, e.g using a USSD command;

Alternatively, the UE behaviour may be that the UE indicates to the HLR using, e.g. a USED message, that the SMS shall be delivered via CS.

The above may be new procedures and the MSC-AS may act as a UE towards the HLR. Existing solutions in some deployed networks require that the UE does this selection on the preferred terminal for EMS delivery, i.e. there is no network support. Instead, according to further optional implementation of the invention it is possible to have SMS delivery assisted by the network, thus resulting in an evolved system capable of easily providing existing and new services.

Further to the advantages already stated as applicable to the invention, its embodiments and illustrative examples, the following advantages are further provided on the basis of the above description relating to the invention and to further optional aspects thereof:

Existing SMS capabilities in the MSC can be reused for SMSoIP, without the need to deploy and integrate a standalone IP-SM-GW;

The existing interfaces towards the SMS Centre, charging systems, lawful intercept and CAMEL/IN service Centre can be reused;

Optionally usage of the ISCI as indicator for SMS, thus facilitating the determination of the type of message and the following processing;

Sending of an SMS via the ISC interface to a MSC-S, which is acting as an adapter and interworking SIP messaging to SMS backend;

Possibility of the MSC AS to add information into SIP messages not possible to carry in SMS;

Possibility to prefer SMSoIP for SMS delivery using HLR capabilities, i.e. not using the SMSoIP extension in the HSS according to TS 23.204.

In the above description, reference has been made to network entities or component entities (like to controller entity or the adapter entity). It is recalled that these entities can be indifferently implemented in one network node or network device or may be implemented in a plurality of network nodes of devices in which the necessary functionalities are distributed in a suitable way.

Moreover, as evident to the reader, the several embodiments and features thereof can be exchanged as necessary. The several examples may be further combined as necessary, as the reader would recognize that any combination thereof (or of parts thereof) is possible without any need to substantial modifications to what has been described.

The invention has been described in relation to particular embodiments and examples which are intended in all aspects to be illustrative rather than restrictive. Those skilled in the art will appreciate that many different combinations of hardware, software and firmware will be suitable for practicing the present invention. Moreover, other implementations of the invention will be apparent to those skilled in the art from consideration of the specification and practice of the invention disclosed herein. It is intended that the specification and the examples be considered as exemplary only. To this end, it is to be understood that inventive aspects lie in less than all features of a single foregoing disclosed implementation or configuration. Thus, the true scope and spirit of the invention is indicated by the following claims.

Where the terms like controller, adapter or network entity are used herewith, no restriction is made regarding how distributed these elements may be and regarding how gathered elements may be. That is, the constituent parts of a unit or element or entity may be distributed in different software or hardware components or devices for bringing about the intended function. A plurality of distinct elements may also be gathered for providing the intended functionalities.

Any one of the above-referred units of a network entity, or an element, or a network device, or a network node, etc. . . . may be implemented in hardware, software, field-programmable gate array (FPGA), application-specific integrated circuit (ASICs), firmware or the like.

In further embodiments of the invention, any one of the above-mentioned and/or claimed parts like controller or receiver (this list being not exhaustive) may be replaced by corresponding controlling means or receiving means.

For convenience, a list of some abbreviations is provided in the following:
GAN Generic Access Network
GAN-C GAN Controller
EPS Evolved Packet System
IM Instant Message
NAS Network Access Signalling
VOLGA Voice over LTE via Generic Access

The invention claimed is:

1. A network entity for handling messages in a communications network, the network entity comprising:
a controller circuit configured to:
provide short message functionality associated with communicating short messages according to a radio network interface of a circuit switched network, wherein the radio network interface comprises an interface disposed between a radio access network node and a core network node, and is configured to communicate with the radio access network node, and wherein the short message functionality provided by the controller circuit is associated with short message applications specific to the circuit switched network; and
perform terminating services for a receiver of Customised Applications for Mobile networks Enhanced Logic (CAMEL) Short Message Service (SMS) messages in the IP multimedia subsystem, or originating CAMEL SMS services for a sender in the IP multimedia subsystem; and
an adapter circuit including an IP multimedia subsystem interface configured to connect to an IP multimedia subsystem, and a controller interface configured to connect to the radio network interface, the adapter configured to:
communicate messages with the IP multimedia subsystem via the IP multimedia subsystem interface;
communicate the short messages with the controller via the controller interface and according to the radio network interface;
adapt messages communicated via the IP multimedia subsystem interface into a first format suitable for communication via the controller interface; and
adapt short messages communicated via the controller interface into a second format suitable for communication via the IP multimedia subsystem interface.

2. The network entity of claim 1 wherein the first format comprises a format associated with short message service standards exchanged over the radio network interface.

3. The network entity of claim 1 wherein the second format comprises a format associated with at least one of a short message and an instant message communicated over the IP multimedia subsystem.

4. The network entity of claim 1 wherein the network entity further comprises a protocol stack handler configured to handle at least a subset of protocol functionalities, the subset comprising at least functionalities associated with the communication of messages over the IP multimedia subsystem.

5. The network entity of claim 1 wherein the short message functionality provided by the controller circuit is further associated with charging for short message services specific to the circuit switched network.

6. The network entity of claim 1 wherein the network entity is configured to determine whether the messages communicated with the IP multimedia subsystem are user messages.

7. The network entity of claim 1 wherein the adapter circuit is further configured to communicate with at least one call session control function provided in the IP multimedia subsystem.

8. The network entity of claim 1 wherein the network entity is configured to inform a home location register that a subscriber is reachable for short message services over the IP multimedia subsystem.

9. A system for handling user messages in a communications network, the system comprising:
at least a first network circuit configured to handle call session control functions in an IP multimedia subsystem;
a second network circuit configured to handle user messages, wherein the second network circuit comprises:
an IP multimedia subsystem interface circuit configured to connect to the first network circuit in the IP multimedia subsystem, and to communicate messages with the at least first network circuit in the IP multimedia subsystem;
a controller interface circuit configured to:
connect to a radio network interface of a circuit switched network, and to communicate short message services according to the radio network, wherein the radio network interface comprises an interface disposed between a radio access network node and a core network node, and is configured to communicate with the radio access network node, and wherein the short message functionality provided by the controller circuit is associated with short message applications specific to the circuit switched network; and
perform terminating services for a receiver of Customised Applications for Mobile networks Enhanced Logic (CAMEL) Short Message Service (SMS) messages in the IP multimedia subsystem, or originating CAMEL SMS services for a sender in the IP multimedia subsystem; and
an adapter circuit configured to:
adapt messages communicated via the IP multimedia subsystem interface into a first format suitable for communication via the controller interface-circuit; and
adapt short messages communicated via the controller interface circuit into a second format suitable for communication via the IP multimedia subsystem interface circuit.

10. A method for handling messages in a communications network, the method comprising:
communicating short messages through a radio network interface of a circuit switched network, wherein the radio network interface comprises an interface disposed between a radio access network node and a core network node, and is configured to communicate with the radio access network node, and wherein the short message functionality provided by the controller circuit is associated with short message applications specific to the circuit switched network;

performing terminating services for a receiver of Customised Applications for Mobile networks Enhanced Logic (CAMEL) Short Message Service (SMS) messages in the IP multimedia subsystem, or originating CAMEL SMS services for a sender in the IP multimedia subsystem; and communicating messages through an IP multimedia subsystem; and adapt messages communicated via the IP multimedia subsystem into a first format suitable for communication via the circuit switched network; and adapt short messages communicated via the circuit switched network into a second format suitable for communication via the IP multimedia subsystem.

11. A computer program product for handling messages in a communications network, the computer program product comprising a non-transitory computer-readable medium having instructions stored thereon that, when executed by a programmable system, configure the programmable system to:

communicate short messages through a radio network interface of a circuit switched, wherein the radio network interface comprises an interface disposed between a radio access network node and a core network node, and is configured to communicate with at least a node of a radio access network, and wherein the short message functionality provided by the controller circuit is associated with short message applications specific to the circuit switched network;

perform terminating services for a receiver of Customised Applications for Mobile networks Enhanced Logic (CAMEL) Short Message Service (SMS) messages in the IP multimedia subsystem, or originating CAMEL SMS services for a sender in the IP multimedia subsystem;

communicate messages through an IP multimedia subsystem; and perform at least one of:
  adapt messages communicated via the IP multimedia subsystem into a first format suitable for communication via the circuit switched network; and
  adapt short messages communicated via the circuit switched network into a second format suitable for communication via the IP multimedia subsystem.

* * * * *